(12) United States Patent
Tribble et al.

(10) Patent No.: US 10,516,764 B1
(45) Date of Patent: Dec. 24, 2019

(54) EFFICIENT MODIFICATION OF COMPRESSED DATA

(71) Applicant: Amazon Technologies, Inc., Seattle, WA (US)

(72) Inventors: Alexander Julian Tribble, Seattle, WA (US); Maxim Chetrusca, Iasi (RO); Dan Mutescu, Iasi (RO); Radu Weiss, Bucharest (RO)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 15/382,434

(22) Filed: Dec. 16, 2016

(51) Int. Cl.
*G06F 21/60* (2013.01)
*H04L 29/06* (2006.01)
*H03M 7/30* (2006.01)
*H03M 7/46* (2006.01)
*H04L 29/08* (2006.01)

(52) U.S. Cl.
CPC .......... *H04L 69/04* (2013.01); *H03M 7/3086* (2013.01); *H03M 7/3088* (2013.01); *H03M 7/46* (2013.01); *H04L 63/06* (2013.01); *H04L 67/2828* (2013.01)

(58) Field of Classification Search
CPC ............................. G06F 21/60; G06F 2212/40
See application file for complete search history.

(56) References Cited

U.S. PATENT DOCUMENTS

| | | | |
|---|---|---|---|
| 2002/0141590 A1* | 10/2002 | Montgomery | .......... H04L 9/065 380/277 |
| 2009/0190760 A1* | 7/2009 | Bojinov | ................ G06F 3/0608 380/269 |
| 2014/0365785 A1* | 12/2014 | Deforest | ............. G06F 12/1408 713/193 |

\* cited by examiner

*Primary Examiner* — Izunna Okeke
(74) *Attorney, Agent, or Firm* — Davis Wright Tremaine LLP

(57) ABSTRACT

A computing device may receive a compress data streams which may then be decompressed to generate decompressed data. The computing device may then determine if the decompressed data includes a flag indicating that the decompressed data should be modified. If the decompressed data is to be modified, the computing device may add padding values to the compressed data stream until a boundary block of the compressed data stream is reached. The modified compressed data stream may then be transmitted to an endpoint.

20 Claims, 8 Drawing Sheets

EFFICIENT MODIFICATION OF COMPRESSED DATA

BACKGROUND

Different networks provide varying levels of security and users may trust different networks more than other networks. Furthermore, in a large distributed computing system (e.g., multiple distributed data centers) of a computing resource service provider, various customers, users, services, and resources of the computing resource service provider are in frequent communication with each other over various networks and intermediaries. Keeping the system secure becomes more challenging as services and computing resources are added to these large distributed computing systems and as the complexity and usage of these systems increases. In such distributed computing systems, it can be difficult to identify the vulnerabilities of the system. Certain computing devices and/or computing resources may be located in different networks. Furthermore, it can also be difficult to isolate and troubleshoot issues with the system, and even when issues are identified, reliably securing the system may be challenging. In addition, various standards and regulations may require data to be secure when in transit over networks such as the Internet.

BRIEF DESCRIPTION OF THE DRAWINGS

Various techniques will be described with reference to the drawings, in which.

DETAILED DESCRIPTION

Figure 1:
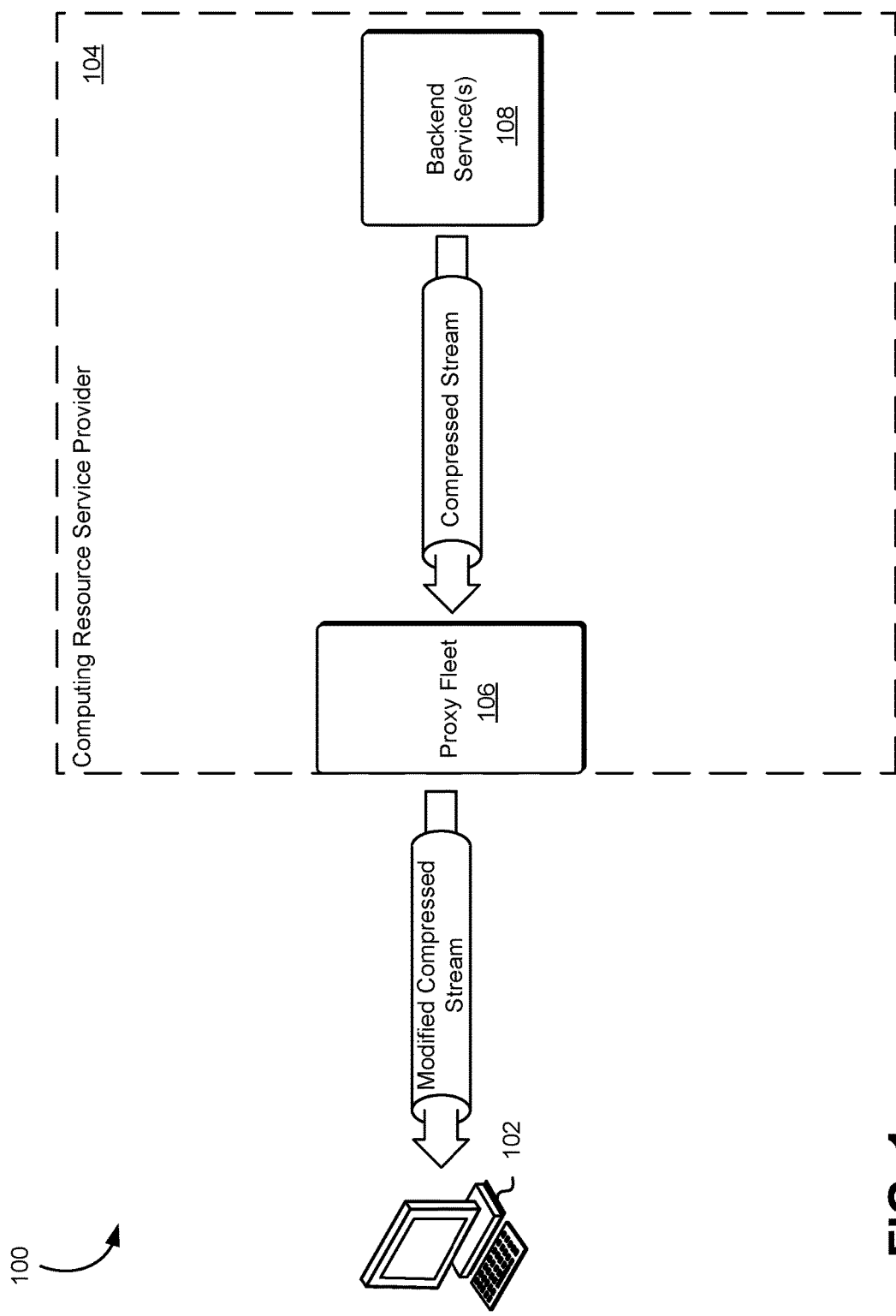
FIG. 1 illustrates an environment in which a proxy fleet may efficiently rewrite data included in a compressed data stream in accordance with an embodiment.

In various examples below, techniques for conserving bandwidth and computational resources using compression are described. Data entering, exiting, and/or traveling along various networks operated by a computing resource service provider or other entity is compressed and transmitted in a stream of data to increase efficiency, reduce latency, and reduce load on network devices. In addition, portions of the data included in compressed data stream may be encrypted and secured from unauthorized access by various intermediaries along various network paths. For example, sensitive data generated by a backend service may be encrypted and transmitted to a client device in a compressed data stream. A proxy fleet and/or secure proxy fleet, described in greater detail below, may be responsible for processing at least a portion of the compressed data stream so that the data included in the compressed data stream can be consumed by the client device operated by the customer. In addition, encrypted sensitive data exiting various networks operated by the computing resource service provider may be decrypted such that the sensitive data is accessible to a client device. This sensitive data may include credit card number, e-mail address, physical addresses, passport number, telephone numbers, contacts, passwords, banking information, customer identification information, communications, or any other information a customer may consider private and/or sensitive. The computing resource service provider may provide a variety of services and/or support (e.g., by providing access to computing resources) to other entities providing services to customers.

These backend services may communicate with customers through various service endpoints, and the service endpoints may be connected to a public network such as the Internet. For example, a customer may interact with a retail service exposed as a website to customers, and the retail service may stream compressed data to the customer in response to various customer interactions with the website. The customer interactions may include Hypertext Transfer Protocol (HTTP) request (e.g., GET and POST requests) transmitted towards backend services. Furthermore, the communication between the customer and the backend services may be facilitated by various proxy devices and/or proxy fleets. As described above, sensitive data may be protected using various encryption techniques such as encryption using symmetric and/or asymmetric keys. However, these methods require that sensitive data be decrypted or other modifications be made to the compressed data stream by the proxy devices and/or proxy fleets so that the customer may consume the data provided by the backend services Therefore, to ensure that customer can consume the data the compressed data stream may be modified to produce a compressed data stream.

A decompression module, a data modification module, and/or a data recompression module may be executed by the proxy devices and/or proxy fleets to provide efficient modification of the compressed data stream. These modules may be executed in an isolated environment or otherwise protected from access from outside of the modules. Configuration information may be generated based at least in part on the backend service and provided to the data modification module executed by the proxy devices and/or proxy fleets. The configuration information may include a variety of information described in greater detail below such as compression algorithms, marker information, cryptographic key, instructions on modifications to data, or other information suitable for modifying a compressed data stream. Each data modification module may service a single backend service or a plurality of backend services.

The data modification module may perform different operations for different data types. For example, sensitive data may be decrypted and the decrypted sensitive data may be injected or reinserted into a modified compressed data stream. As the compressed data stream is received by the proxy fleet, it may be buffered temporarily to allow for the proxy fleet to determine what modification, if any, to make to the compressed data stream. In addition, the compressed data stream may be decompressed based at least in part on a compression algorithm. The proxy fleet or component thereof, such as the data modification module, may parse or otherwise detect data to be modified. As described in greater detail below, this may include various modifications to the data including modifying values, injecting content, decrypting data, encrypting data, or otherwise modifying data from consumption by a customer. Once the data is modified, a data recompression module may determine a boundary block for the compressed data stream based at least in part on the compression algorithm. The boundary block includes a point or block in the compressed stream in which data included in the compressed stream no longer references previous blocks and/or data included in the stream. The recompression module may then compress the modified data and add padding to the compressed data stream to generate a modified compressed data stream that when decompressed by the client device does not generate an error as a result of modified data. The proxy fleet may then continue to stream data in the compressed stream, including the modified data. This process allows the proxy fleet to rewrite only the portion of the compressed stream that should be modified for consumption by the customer and increased efficiency, reduce latency, and reduces load on the proxy fleet.

In various examples, the proxy devices and/or proxy fleets may be a part of or integrated in various content delivery networks (CDNs). These CDNs enable lower latency communication with the customers and provide efficient processing for customer requests. As described above, the data protection module may be implemented by the proxy devices and/or proxy fleets included in the CDN. In addition, the computing resource service provider or other entity may operate a cryptographic key management service, described in greater detail below, to provide efficient access to cryptographic material and/or cryptographic functions. For example, when receiving sensitive data to decrypt, the data modification module may request decryption of the data by the cryptographic key management service. The cryptographic key management service may be a process of the proxy devices and/or proxy fleets or may be executed on a separate computing device accessible to the data protection module.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a proxy fleet 106 may efficiently rewrite data included in a compressed data stream in accordance with an embodiment. A computing resource service provider 104 may provide customers 102 with access to the backend services 108. The backend services 108 may be operated by the computing resource service provider 104 or other entities. For example, the computing resource service provider 104 may provide an organization with access to computing resources provided by the computing resource service provide 104 to implement various services exposed to customers 102, such as a streaming media service, website, or other application. The computing resource service provider 104 may operate various networks, computing devices, services, applications, or other computing resources and provide customers 102 and other entities access to perform various operations.

As illustrated in FIG. 1, the backend service 108 may provide data to the customer 102 in a compressed data stream. Furthermore, the compressed data stream may include sensitive data or other data to be modified prior to receipt of the data by the customer 102. In various embodiments, the data may be encrypted to protect the data from various intermediaries that may not be authorized to access the sensitive data. In addition, the intermediaries may include any computing resource operated by the computing resource service provider 104 or other entity. For example, a particular intermediary, such as a rendering fleet, may be responsible for organizing the compressed data stream so it can be consumed by the customer 102.

Customers 102 or other entities associated with sensitive data may want read and/or write access to sensitive data restricted to trusted entities, both computing devices and persons. As described above, the computing resource service provider 104 may define and determine various requirements to maintain the security and privacy of sensitive information by regulation, legal privilege, competitiveness, contractually (e.g., pricing or other terms with vendors), or any other need to protect sensitive data. Sensitive data includes an address, passport number, a tax identifier, legal information, financial information, customer lists and/or specific customer identifying information, mergers and acquisitions, employee health records and personnel files, and customer payment instruments. Furthermore, the sensitive data may include any data categorized as sensitive by the customer or computing resource service provider. However, to enable a customer to access the sensitive data associated with them, the computing resource service provider 104 may operate a proxy fleet 106 to ensure that the sensitive data is accessible to the customer. The proxy fleet 106 may decrypt sensitive data as it directed to the customer 102 (e.g., data centers, networks, and other computing resources outside of the computing resource service provider environment).

Aside from decryption of the data the proxy fleet 106 may perform any modification to the data included in the compressed data stream. For example, the proxy fleet 106 may add or remove various notices or information included in the stream data. In another example, the proxy fleet 106 may detect and remove confidential or privileged information included in the data. In yet another example, the proxy fleet 106 may inject content such as advertising content into the compressed data stream. In effect, the proxy fleet may efficiently perform any modification to the data included in the compressed data stream for any reason.

The proxy fleet 106 may include applications or other executable code executed by the physical computing resources. As described in greater detail below, the proxy fleet 106 may manage and maintain cryptographic material to encrypt the sensitive data. In addition, the proxy fleet 106 may proxy or otherwise forward requests between the one or more backend services 108 and customers 102. For example, a particular service may expose an endpoint on a public network such as the Internet. The endpoint may allow customers 102 to communicate with that particular backend service by directing service requests to the endpoint exposed on the public network. The proxy fleet 106 may obtain service requests directed to the endpoint and forward the requests to the particular backend service based, at least in part, on information included in the service requests. In response to the service request, the particular backend may stream compressed data to the customer which may include data to be modified prior to consumption by the customer 102.

Furthermore, the proxy fleet 106 may operate a single proxy for each backend service and/or endpoint exposed to customer 102. For example, a particular backend service exposes different endpoints for various types of data. The proxy fleet 106 may isolate the processing of requests directed to each endpoint, for example, by physical isolation (e.g., processing separated by different physical computing hardware) or logical isolation (e.g., process isolation using sandboxing).

The backend services 108, as described above, may be provided by the computing resource service provider 104 or may be provided by one or more other entities utilizing computing resources of the computing resource service provider 104. The backend services 108 may include a number of services such as a retail service, computing instance service, on-demand storage service, block-level storage service, networking service, notification service, document management service, messaging service, or any other service implemented using computing resources of the computing resource service provider 104.

The intermediaries, described above, may include any number of computing resources and/or services of the computing resource service provider 104. In addition, the intermediaries may be operated by other entities besides the computing resource service provider 104. For example, a particular intermediary may include data storage service utilizing various networks of the computing resource service provider 104 to send and receive data from customers 102. The intermediaries may also enforce various security policies and/or levels of security.

Figure 2:
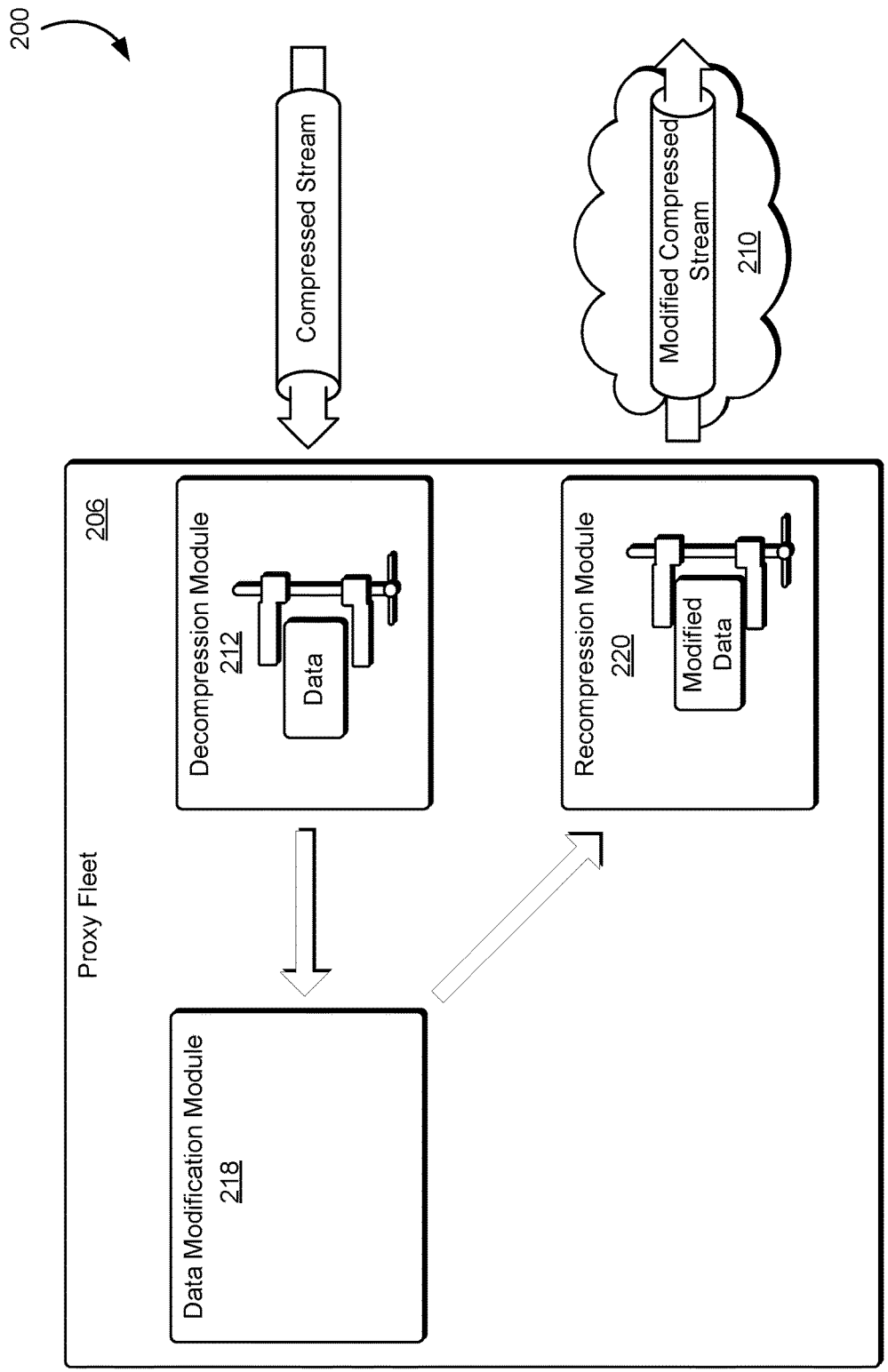
FIG. 2 illustrates an environment in which a proxy fleet may efficiently rewrite data included in a compressed data stream in accordance with an embodiment.

FIG. 2 illustrates an environment 200 in which a proxy fleet 206 may efficiently rewrite data included in a compressed data stream in accordance with an embodiment. As described above, one or more services or computer system executing applications or other executable code may generate streams of compressed data. The compressed data streams may be directed to some endpoint. The endpoint may be a client device operated by a customer, a computer system implementing one or more services of a computing resource service provider, or any other computing device that is capable of receiving a stream of compressed data. Furthermore, the compressed data stream may be intercepted by the proxy fleet 206. The proxy fleet 206 may be responsible for modifying the compressed data stream so that the data included in the compressed data stream may be consumed at the end point.

In various embodiments, the proxy fleet 206 routes network traffic on behalf of the computing resource service provider. The proxy fleet 206 may execute various modules to perform routing and modification operations of the compressed data stream. As described in greater detail below, the modules may be applications or processes executed by a server computer system implementing the proxy fleet 206. Specifically, the proxy fleet 206 may include a decompression module 212, and a data modification module 218, and a recompression module 220. The decompression module 212, the data modification module 218, and the recompression module 220 may be applications or processes stored in memory and executed by one or more processors of the proxy fleet 206. Furthermore, the various modules and computing resources described in the present disclosure may include physical or virtual computing resources or a combination thereof. For example, the proxy fleet 206 may be executed by a virtual computer system instance supported by a physical host computer system.

The decompression module 212 may receive compressed data obtained from the compressed data stream. The compressed data may be obtained through an interface of the proxy fleet 206 such as a network interface and provided to the decompression module 212. The compressed data in the compressed data stream may be compressed using a variety of different compression algorithms that cause the data to be encoded using fewer bits than the original representation of the data. The compression may be lossy or lossless. For example, lossless compression algorithms compress the data by identifying and eliminating statistical redundancies in the data and no information maybe lost during the compression. In another example, lossy compression reduces the number of bits of the data by removing unnecessary or other less important bits that may be removed without causing the data to be undecipherable.

In various embodiments, a compression algorithm that uses lossless and lossy data transformations may be used. The compression algorithms used for both the compressed data stream and the modified compressed data stream may include context tree weighting, Burrows-Wheeler transformations, LZ77, Lempel-Ziv-Welch (LZW), prediction by partial matching (PMM), bzip 2, run-length encoding (RLE), Shared Dictionary Compression for HTTP (SDCH), deflate, or other compression algorithm that may reduce the size of data. In addition, the compressed data stream and the modified compressed data stream may be compressed using the same or different compression algorithms. In various embodiment, the compressed algorithm includes a shared dictionary which is modified based at least in at least in part on the flags and/or markers used to indicate data to be modified. In yet other embodiment, the shared dictionary is modified to prevent compression of encrypted data resulting in an error due to the shared dictionary.

Returning to FIG. 2, the decompression module 212 receives compressed data from the compressed data stream and decompresses the data according to a particular compression module. In addition, the proxy fleet 206 may buffer a portion of the compressed data included in the compressed data stream. The proxy fleet 206 buffers the compressed data so that if the compressed data does not need to be modified the proxy fleet 206 may simply perform operations (e.g., forwarding the compressed data to an endpoint). For example, if the proxy fleet 206 obtains three blocks of compressed data from the data stream and only one block of compressed data is to be modified, rather than recompressing all three blocks the proxy fleet 206 may recompressed the block of compressed data that was modified and use the two unmodified blocks stored in the buffer for various operations. Once the compressed data is decompressed the decompression module 212 may provide the decompressed data to the data modification module 218.

The data modification module 218 may parse the received decompressed data and determine if the decompressed data is to be modified prior to transmission to the endpoint or other operation of the proxy fleet 206. As described in greater detail below, a flag or other marker may be inserted into the data prior to compression by the computer system transmitting the compressed data stream indicating the data associated with the flag or marker is to be modified. In some embodiments, the data to be modified is determined by type or category information associated with the data and the decompressed data does not include any flags or markers. For example, the data modification module 218 detects encrypted data and decrypts the data. Configuration information may be provided to the data modification module 218 which indicates how to process and modify data. In addition, the configuration information may indicate a compression algorithm to use to decompress and/or recompress that data. Once the data has been modified it may be provided to the recompression module 220.

Recompression module 220 may determine one or more boundary blocks or boundary elements prior to recompressing the modified data. The one or more boundary blocks or boundary elements may be a location in the stream of data (e.g., a particular bit or set of bits) at which point the stream of compressed data may be modified without affecting the result of decompressing the stream of compressed data. For example, simply adding compressed modified data to the compressed stream may cause an error during decompression as a result of a back reference included in the compressed data stream no long pointing to the same data. As a result, the recompression module 220 may determine one or more boundary blocks indicating at which point compressed modified data may be added to the stream without causing an error.

The recompression module 220 may determine a length (e.g., a number or bits and/or blocks) between the data that has been modified by the data modification module and the one or more boundary blocks or boundary elements. The recompression module 220 may then add padding corresponding to the length of one or more blocks (the padding may be greater than the original length). The padding may include values that are ignored by the decompression application or otherwise decompress to zeros or non-values. The padding may be added at the level of the compression algorithm executed in the recompression module 220. The padding indicates that the modified compressed data ends at the point where the padding starts and the original unmodified compressed data stream continues. The padding may be added based at least in part on the length or other information associated with the modified data.

The secure proxy fleet may then transmit the modified compressed stream over a network 210. Although only one network 210 is illustrated within the environment 200, the network 210 may include a variety of different networks implemented by various entities. For example, the network 210 may include a network backbone or other network structure that is part of a publicly addressable network such as the Internet. As described in greater detail below, the network 210 may include public networks, private networks, content delivery networks, and other networks which may be implemented by different entities and/or services and may enforce different security policies and may be accessible by different entities and/or services. Although the modules illustrated in FIG. 2 are shown as separate modules, the operations of one or more of the modules may be combined into a single module. In addition, the execution of the modules may be done in a single process or a plurality of processes.

Figure 3:
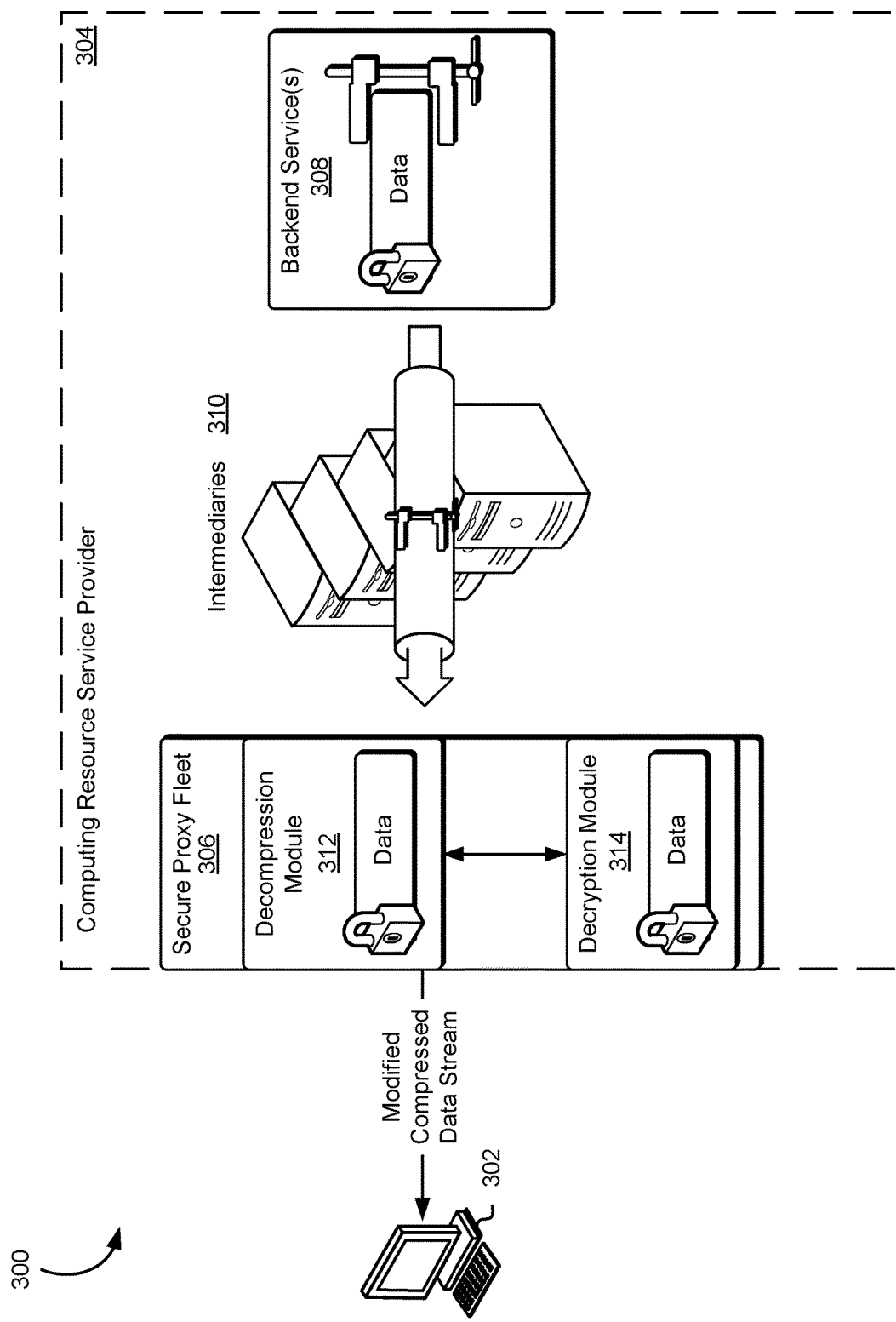
FIG. 3 illustrates an environment in which a secure proxy fleet may efficiently rewrite data included in a compressed data stream including sensitive data in accordance with an embodiment.

FIG. 3 illustrates an environment 300 in which a secure proxy fleet 306 receives sensitive data compressed in a data stream from one or more backend services 308 prior to forwarding the sensitive data to a customer 302 in accordance with an embodiment. A computing resource service provider 304 may provide a secure proxy fleet 306 to enable the backend services 308 to communicate with the customers 302. The backend services 308 may communicate with the customers 302 through a webpage, website, service call, user interface, command line interface, or application, such as a stand-alone application or mobile application that communicates data from the backend services 308 over one or more intermediaries 310 to the customer 302. The backend services 308 may be operated by the computing resource service provider 304 or other entities. For example, the computing resource service provider 304 may provide an organization with access to computing resources to implement various services and exposed those services to the customer 302, such as an online retail service, website, or other application. The computing resource service provider 304 may operate various networks, computing devices, services, applications, or other computing resources and provide customers and other entities access to perform various operations.

As illustrated in FIG. 3, the backend service 308 may direct a compressed data stream including sensitive data to the customer 302. The sensitive data may be encrypted by the backend service 308 as described above. Furthermore, the encrypted sensitive data may be intercepted by the secure proxy fleet 306 and processed or otherwise decrypted such that the sensitive data may be accessible to the customer 302. In addition, the compressed data stream may be modified by rewriting only the portion of the compressed data stream containing the encrypted sensitive data. As described above, the secure proxy fleet 306 may determine one or more boundary blocks in the compressed data stream and add padding until the one or more boundary blocks in the compressed data stream is reached. The secure proxy fleet 306 may then insert, inject, or otherwise cause the decrypted data to be included in the compressed data stream as described in greater detail below.

The secure proxy fleet 306 may include a decompression module 312 and a decryption module 314. The decompression module 312 and the decryption module 314 may be applications or processes executed by one or more processors of the secure proxy fleet 306. Furthermore, the various modules and computing resources described in the present disclosure may include physical or virtual computing resources or a combination thereof. For example, the secure proxy fleet 306 may be executed by a virtual computer system instance supported by a physical host computer system.

Returning to FIG. 3, the decompression module 312 may decompress the compressed data stream directed to the customer 302. In addition, the decompression module 312 may determine if decompressed data included in the compressed data stream is to be modified prior to delivery to the customer. For example, the decompressed data includes a marker, the marker indicating that encrypted data, included in the compressed data stream, is to be decrypted prior to consumption by the client. The decompression module may also render the webpage or a portion of a webpage including encrypted data and may provide the rendered webpage or portion thereof to the decryption module 314 for decryption of the encrypted content. In yet other embodiments, the decompression module 312 may detect encrypted data based at least in part on a mark or other mechanism and provide the encrypted data to the decryption module 314.

The decryption module 314 may return the plaintext of the data which may be inserted into the compressed data stream by the decompression module 312. In some embodiments, all or a portion of the data stream may be buffered and held until the decompression module 312 and the decryption module 314 process the decompressed data obtained from the compressed data stream. For example, the secure proxy fleet 306 may buffer a portion of the compressed data stream such that unmodified portions of the compressed data stream may be forwarded to the customer 302 without additional compression or other processing. In this manner, only the decrypt data is recompressed and the additional overhead of recompressing the entire data stream is avoided. In other words, the secure proxy fleet 306 only needs to recompress the portion of the compressed data stream that has been modified.

The compressed data stream may be processed prior to being obtained by the secure proxy fleet. For example, the one or more intermediaries 310 may include a rendering fleet which receives webpage data from the backend services 308 and generates rendered webpage content which may be forward to the secure proxy fleet. In addition, the intermediaries 310 may inject content into the data transmitted to the secure proxy fleet 306.

Although a customer 302 is illustrated in FIG. 3 as the endpoint for the compressed data stream from the backend service 308, the compressed data stream may be distributed by the secure proxy fleet 306 to another service, for example, in a service-to-service call. In addition, the customer 302 may include various different computing devices or systems. For example, the customer 302 may include a secure storage location included in a data center operated by the customer 302. As described above the secure proxy fleet 306, decompression module 312, and the decryption module 314 may receive configuration information which may define the operation of the various components. For example, the configuration information may indicate a mechanism for enabling the decompression module to detect encrypted data to be modified. In another example, the configuration information may indicate a cryptographic algorithm or key for use by the decryption module 314 to decrypt the encrypted data.

The backend service 308 may also maintain authorized data storage. These authorized data storage may be within the backend services 308 or may be in a remote location relative to the backend service 308 and may include a single data store or a distributed data store. The backend service 308 may maintain cryptographic keys and or credential information to access the authorized data storage. The backend services 308 may be executed using various computing devices (e.g., bare metal hypervisor, virtual machine, or a virtualization container).

The intermediaries 310 may include any number of untrusted intermediate computer systems or services that are either untrusted for the level of sensitivity of the data or have no authorized access to the sensitive information. Furthermore, the intermediaries 310 may be responsible for directing requests from the backend services 308 to the secure proxy fleet 306. For example, data transmitted by the backend service 308 may be authenticated and authorized by an intermediary and then forwarded to the secure proxy fleet 306. The secure proxy fleet 306 may determine if encrypted sensitive data is to be consumed at the destination. For example, the client device is authorized to receive the compressed data stream, then the secure proxy fleet 306 may determine that the destination is able to consume the compressed data stream. If the data is to be consumed by the destination (e.g., service or customer device), the compressed data stream is decrypted. For example, the compressed data stream may be decrypted with a private key which may be stored locally by the secure proxy fleet 306 in a secure storage location, or remotely, for example, by a cryptographic key management service as described above. In various embodiments, the secure proxy fleet 306 maintains the decrypted sensitive data in memory for a short interval of time such as 5-20 seconds.

The backend services 308 may generate secure proxy fleet 306 including service calls to proxy website pages, including pagelets, widgets, and/or servlets. Each backend service may be considered a tenant of the secure proxy fleet 306, and may have a tenant identifier. Each tenant may have a reserved and isolated container in the secure proxy fleet 306 which may be isolated from other tenants and any other process executed by the secure proxy fleet 306 (e.g., an operating system). The operating system may enforce process isolation and mandatory access controls. As a result, any changes to the operation of the secure proxy fleet 306 or component therefore may request termination of the process and re-provisioning of the process with new configuration information.

Each tenant container (e.g., each isolated process associated with a tenant) may be defined by configuration information including a private key or a digital envelope symmetric key for decryption, a presentation format, address information for an exposed endpoint (e.g., publicly addressable address), or other information suitable for distributing secured sensitive data. When providing sensitive data to remote devices and systems, the secure proxy fleet 306 may establish a cryptographically protected communications channel. In some embodiments, the secure proxy fleet 306 may re-establish or re-use a TLS connection generated in response to the customer 302 submitting a request to the backend services 308. Other mechanisms may be used to secure the sensitive data once it has been decrypted by the decryption module 314 and is to be transmitted to the customer. For example, the data to be transmitted to the customer, including the decrypted sensitive data, may be encrypted with the customer's public key.

Figure 4:
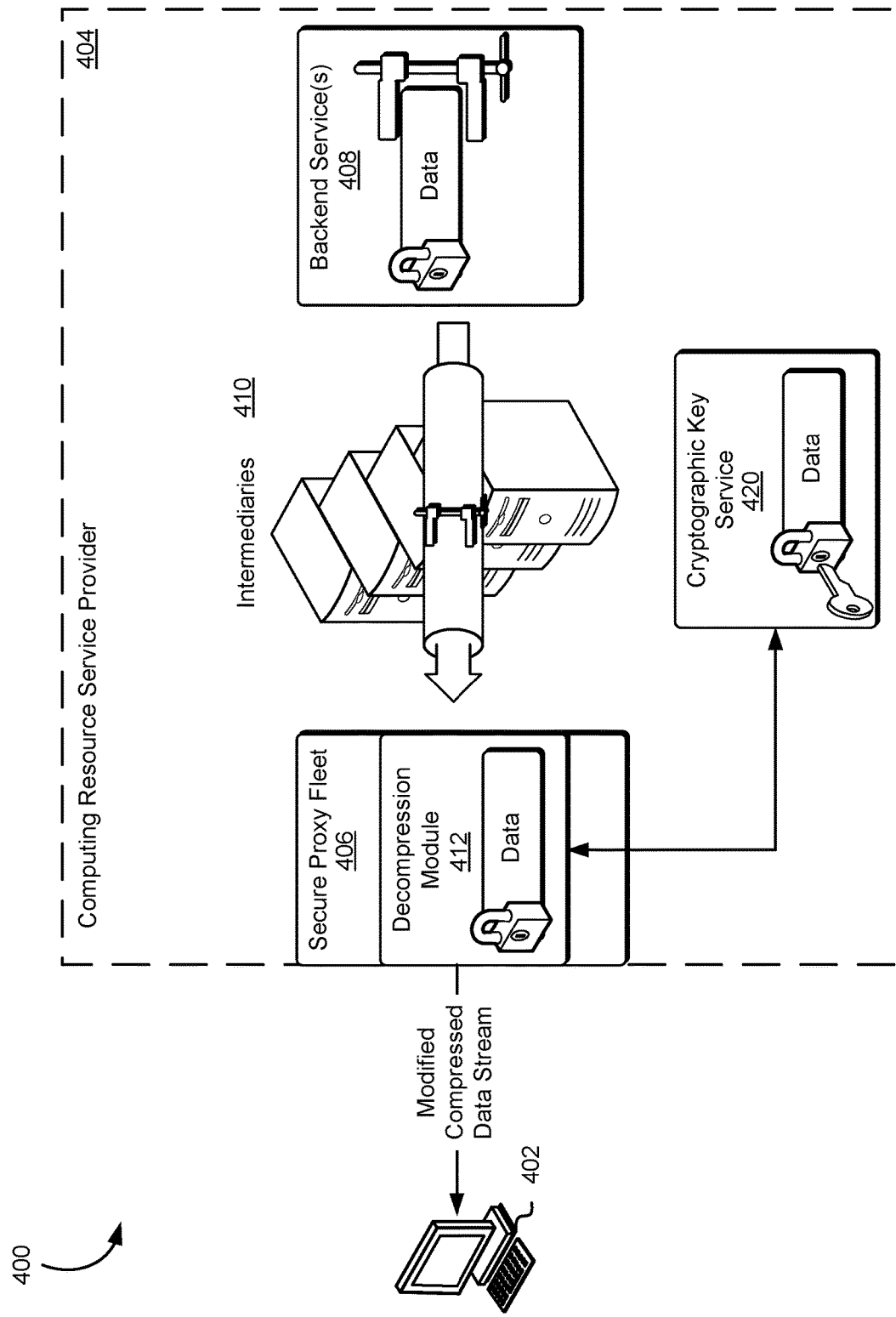
FIG. 4 illustrates an environment in which a secure proxy fleet may efficiently rewrite data included in a compressed data stream including sensitive data in accordance with an embodiment.

FIG. 4 illustrates an environment 400 in which a secure proxy fleet 406 receives a compressed data stream including encrypted data and, using a cryptographic key management service 420, decrypts the encrypted data prior to forwarding a modified compressed data stream to a customer 402 in accordance with an embodiment. A computing resource service provider 404 may provide customers 402 with access to the backend services 408. The customers 402 may access the backend services 408 through a webpage, service call, user interface, command line interface, or application, such as a stand-alone application or mobile application that communicates data to the backend services 408 over one or more intermediaries 410. The backend services 408 may be operated by the computing resource service provider 404 or other entities. For example, the computing resource service provider 404 may provide an organization with access to computing resources provided by the computing resource service provider 404 to implement various services exposed to the customer 402, such as an online retail service, website, or other application. The computing resource service provider 404 may operate various networks, computing devices, services, applications, or other computing resources and provide customers and other entities access to perform various operations.

As illustrated in FIG. 4, the customers 402 may receive modified compressed data streams including decrypted data, decrypted through the use of a cryptographic key management service 420 hosted by the computing resource service provider 404 or other entity. The decrypted data may be transmitted from a trusted entity or trusted location operated by the backend services 408. Furthermore, the encrypted data may be encrypted by an encryption module and/or the cryptographic key management service 420 as a result of an operation or command of the backend services 408. The data may be encrypted to prevent exposure of the data along a network path including the one or more intermediaries 410. In various embodiments, the encryption module may transmit an API call to the cryptographic key management service 420 to encrypt the data. In yet other embodiments, the encryption module may request key material from the cryptographic key management service 420 which is used to encrypt the data.

In addition, the key material may be encrypted by the cryptographic key management service 420. In other words, the data transmitted to the cryptographic key management service 420 may be reduced by simply obtaining and encrypting cryptographic keys from the cryptographic key management service 420. In another example, the encryption module may transmit the data in the encryption request to the cryptographic key management service 420, in response the cryptographic key management service 420 returns encrypted data and, in some embodiments, the encryption key (encrypted or in plaintext) is returned it to the encryption module. Furthermore, the cryptographic keys may be included in the compressed data stream.

The cryptographic keys may be encrypted with a key maintained by the secure proxy fleet 406 or may include metadata or other information which enables the secure proxy fleet to obtain the cryptographic keys from the cryptographic key management service 420. Obtaining the cryptographic keys from the cryptographic key management service 420 may include transmitting a request including encrypted cryptographic keys and receiving in response decrypted cryptographic keys or may include transmitting a request including identifying information for the cryptographic keys and receiving in response the identified cryptographic keys.

Although the cryptographic key management service 420 depicted in FIG. 4 is illustrated as a separate entity, all or a portion of the functionality of the cryptographic key management service 420 may be included in the secure proxy fleet 406 and/or the backend services 408. For example, a portion of the cryptographic key management service 420 may be executed as a kernel level process or micro-service by the secure proxy fleet 406. In these cases, the encryption module may transmit a request to the kernel level process of the cryptographic key management service 420 executed by the secure proxy fleet 406 to obtain cryptographic material. In addition, the cryptographic key management service 420 may periodically or aperiodically transmit and/or update the cryptographic key material maintained by the kernel level process of the cryptographic key management service 420 executed by the secure proxy fleet 406.

Returning to FIG. 4, although the one or more intermediaries 410 are illustrated within the computing resource service provider environment, the one or more intermediaries 410 may include a variety of different intermediaries implemented by various entities. For example, the one or more intermediaries 410 may include a network backbone or other network structure that is part of a publicly addressable network such as the Internet. As described in greater detail above, the intermediaries 410 may include any number of computing devices and may enforce different security policies and may be accessible by different entities and/or services. In addition, various computing devices may receive requests and/or data objects including the encrypted data as they are routed between the customer 402 and the backend services 408. For example, a request processing device may receive a request from the secure proxy fleet 406, including encrypted data directed to a particular backend service, and route the request to the appropriate instance of the backend service.

A decompression module 412 may enable the secure proxy fleet 406 to detect encrypted data. The decompression module 412 may be a single process or plurality of processes, applications, or executable code that, when executed by one or more processors of the secure proxy fleet 406, causes the secure proxy fleet 406 to perform the operations described in the present disclosure. In addition, the decompression module 412 may have configuration information pushed or otherwise provided. The configuration information may include template information generated by the backend service 408 or administrator or other entity associated with the backend services 408. The configuration information may be provided to the decompression module 412 at provisioning or instantiation of the processes executing the decompression module 412. Furthermore, the configuration information may include information suitable for identifying encrypted data and each backend service, website, application, and/or customer may provide their own configuration information. The configuration information may indicate a data type, field, format, or flag associated with encrypted data which may be used by the decompression module 412 to detect sensitive data.

As described above, the decompression module may decompress the obtained compressed data stream and may parse or otherwise detect encrypted data included in the compressed data stream. Once the encrypted data is detected, the decompression module or other process of the secure proxy fleet 406 may transmit a request to the cryptographic key management service 420 to decrypt the encrypted data. As described above, the request may include the data to be decrypted, may include encrypted key material to be decrypted so that the decompression module 412 or other component of the secure proxy fleet 406 may decrypt the encrypted data, or may include identifying information for the encryption key used to encrypt the data so that the decompression module 412 or other component of the secure proxy fleet 406 may decrypt the encrypted data.

Although not illustrated in FIG. 4, a TLS terminator may convert encrypted data transmitted over a cryptographically secure communication channel (e.g., HTTPS connection) to plaintext and forward or otherwise provide decrypted data so that the decompression module 412 or other component of the secure proxy fleet 406 may determine whether to modify the compressed data stream. In various embodiments, the decompression module 412 or other component of the secure proxy fleet 406 may parse decompressed data, and if the decompression module 412 determines the received data includes encrypted data, the decompression module 412 may forward or otherwise provide the cryptographic key management service 420 the data to be decrypted.

The backend service 408 may also encrypt and protect data directed towards a client device. In such embodiments, the backend service 408 may generate a library call or API call to the cryptographic key management service 420. The request to encrypt data to be transmitted to the client device may be the same as described above. The cryptographic key management service 420, which may be a service of the computing resource service provider 404, manages transparent distribution of cryptographic keys (e.g., private keys) to host computer systems. The backend service 408 may simply transmit an API call or other call to the cryptographic service to encrypt sensitive data, and the cryptographic key management service 420 may execute one or more encryption workflows and return encrypted sensitive data.

In one example, the backend service 408 may transmit a customer passport number to the cryptographic key management service 420, which may be a remote or a local service (e.g., a daemon running a host computer system of the backend service 408), then the cryptographic management key service 420 returns the encrypted passport number to the backend service 408. The encrypted data returned by the cryptographic key management service 420 may include other information such as a time stamp or signature. The backend service 408 may then generate a response, request and/or content, including the encrypted data, to be transmitted to an endpoint such as a client device operated by the customer 402. The backend service 408 may then generate a compressed data stream including the encrypted data using a compression algorithm.

The encrypted data may be routed across the one or more intermediaries 410 towards the secure proxy fleet 406 or other service or computer system for processing. For example, the backend service 408 may transmit a webpage in a compressed data stream to the customer 402, a rendering fleet may receive the compressed data stream including the encrypted data from the backend service 408 and convert the compressed data stream into Hyper Text Markup Language (HTML) or other format. In addition, the secure proxy fleet 406 may perform additional processing of the compressed data stream prior to or along with decrypting and inserting the decrypted data into the modified compressed data stream. As described above, the secure proxy fleet 406 may determine that the webpage directed to the customer includes encrypted data based at least in part on the presence of a flag or other marker included in the compressed data stream transmitted and/or intercepted by the secure proxy fleet 406. The secure proxy fleet 406 may perform various processing operations such as unwrapping and modifying request/responses included in the compressed data stream.

The cryptographic key management service 420 may maintain metadata associated with cryptographic keys and may determine access rights to the cryptographic key based at least in part on a security policy and/or the metadata. In addition, particular cryptographic materials may be associated with particular data types. The cryptographic key management service 420 may also maintain a local or centralized encryption key store. The key store may include asymmetric keys or symmetric keys. Furthermore, the cryptographic key management service 420 may be used to provide digital envelope encryption. In addition, various methodologies for secure out-of-band transmission of the private key (for the asymmetric case) or the symmetric key (for the digital envelope encryption case) may be maintained by the cryptographic key management service 420 and be subject to both periodic and aperiodic audit.

Figure 5:
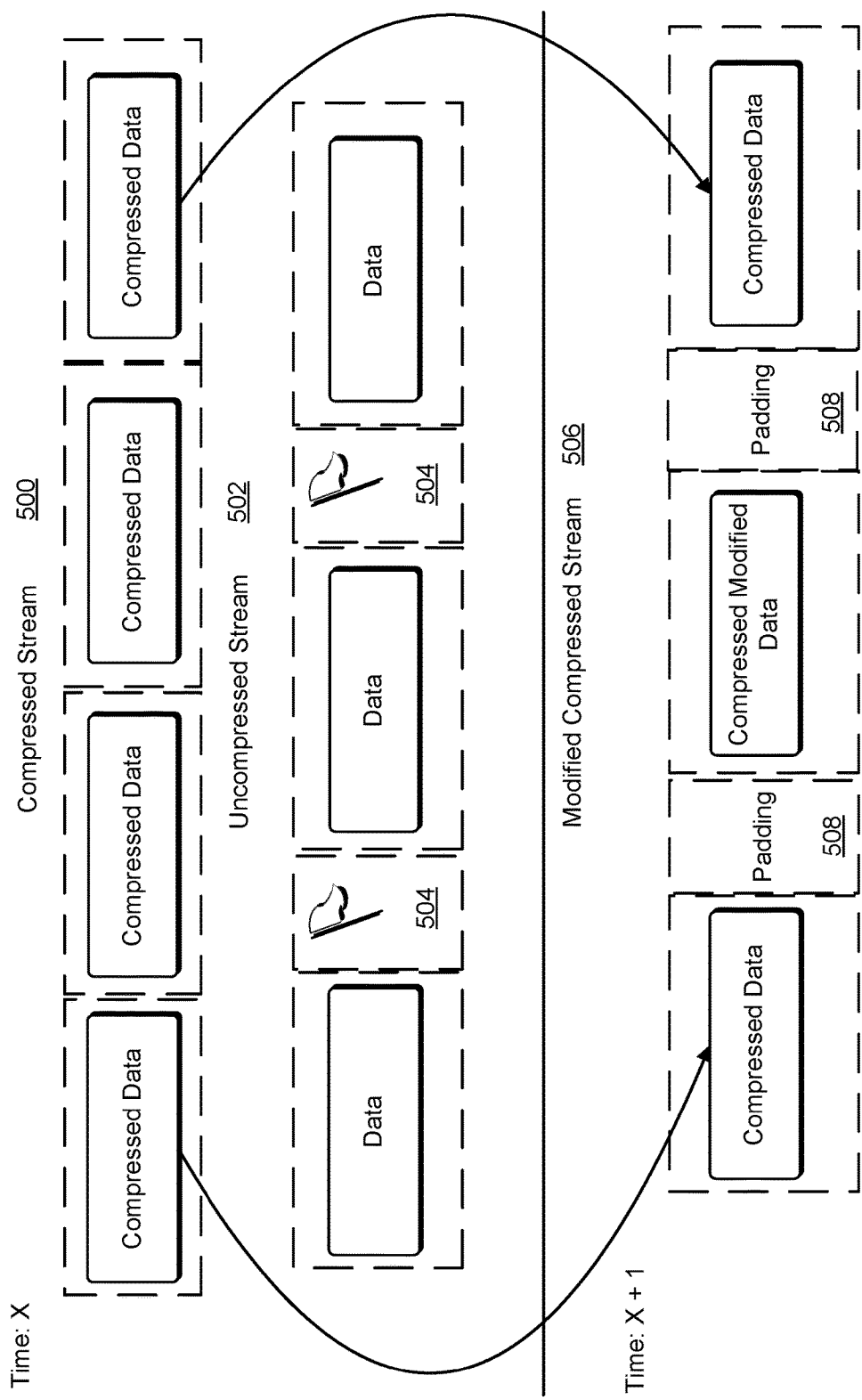
FIG. 5 is a diagram illustrating a compressed data stream and a modified compressed data stream in accordance with an embodiment.

FIG. 5 is a diagram illustrating processing a compressed data stream 500 to create a modified compressed data stream 506 in accordance with an embodiment. The compressed data stream 500 may be received at a proxy fleet as described above. The compressed data stream 500 may be obtained from various computing devices as described above. The compressed data stream 500 may be compressed using a variety of compression algorithms. In addition, the compressed data stream 500 may include an encrypted payload. The encrypted payload and the compressed data stream 500 may be formatted by a source according to a various different formatting rules. The formatting rules may be established by the computing resource service provider and may enable efficient processing of the compressed data stream 500 and information included in the compressed data stream 500.

For example, the backend service generates an HTTP response directed to a customer and formats the HTTP response to generate the compressed data stream 500 and transmits the compressed data stream 500 towards a customer. As described above, the response may include encrypted data which may be encrypted in accordance with a particular format to enable the proxy fleet to process the request and decrypt the encrypted data. The encrypted payload may have an arbitrary length and may not be known or otherwise determined prior to transmission of the encrypted payload in compressed data stream 500. Furthermore, once the compressed data stream 500 or a portion thereof is received by the proxy fleet, a decompression module or other component of the proxy fleet may decompress the compressed data stream 500 to generate an uncompressed data stream 502. As described above, the compressed data stream 500 may be buffered or otherwise stored until the uncompressed data stream 502 is processed. For example, the uncompressed data stream 502 may be processed by decrypting the encrypted payload.

Other information included in the encrypted payload either according to a particular formatting or based at least in part on an operation of the backend services includes a service type, a website type, a timestamp, a signature, key material, routing information, an access policy, authentication information, authorization information, or any other information suitable for inclusion in the encrypted payload. The format of the encrypted payload may be set by the one or more backend services, the computing resource service provider, a website operator, a customer, a public standard setting committee, or any other entity.

The encrypted payload and/or the uncompressed data stream 502 may include metadata that is undecipherable to computing resources without authorization. In certain embodiments, the encrypted payload may be undecipherable but for the metadata which may indicate a variety of information including information associated with the key material used to encrypt the payload, an entity responsible for encrypting the payload, audit information, authentication information, or other such information. In yet other embodiments, the payload is not encrypted but may still be modified by the proxy fleet. For example, the data may include a content that is to be updated, replaced, or otherwise modified such as a date or time associated with the uncompressed data stream 502.

As illustrated in FIG. 5, the uncompressed data stream 502 may include flags 504. The flags 504 may indicate a portion of the uncompressed data stream 502 to be modified by the secure proxy fleet. In various embodiments, the flag 504 also indicates an operation to be performed on the data to modify the data. For example, the flag 504 may include metadata indicating content to add and/or insert into the data to generate modified data. In another example, the flag 504 may include metadata containing identification information for a cryptographic key that may be provided to a cryptographic key management service to obtain decrypted data to be included in a modified compressed data stream 506. As described above, the modified compressed stream may include compressed modified data, padding 508, and compressed data obtained from the compressed data stream 500. The padding 508 may be added to the modified compressed data stream 506 until one or more boundary blocks are reached.

Figure 6:
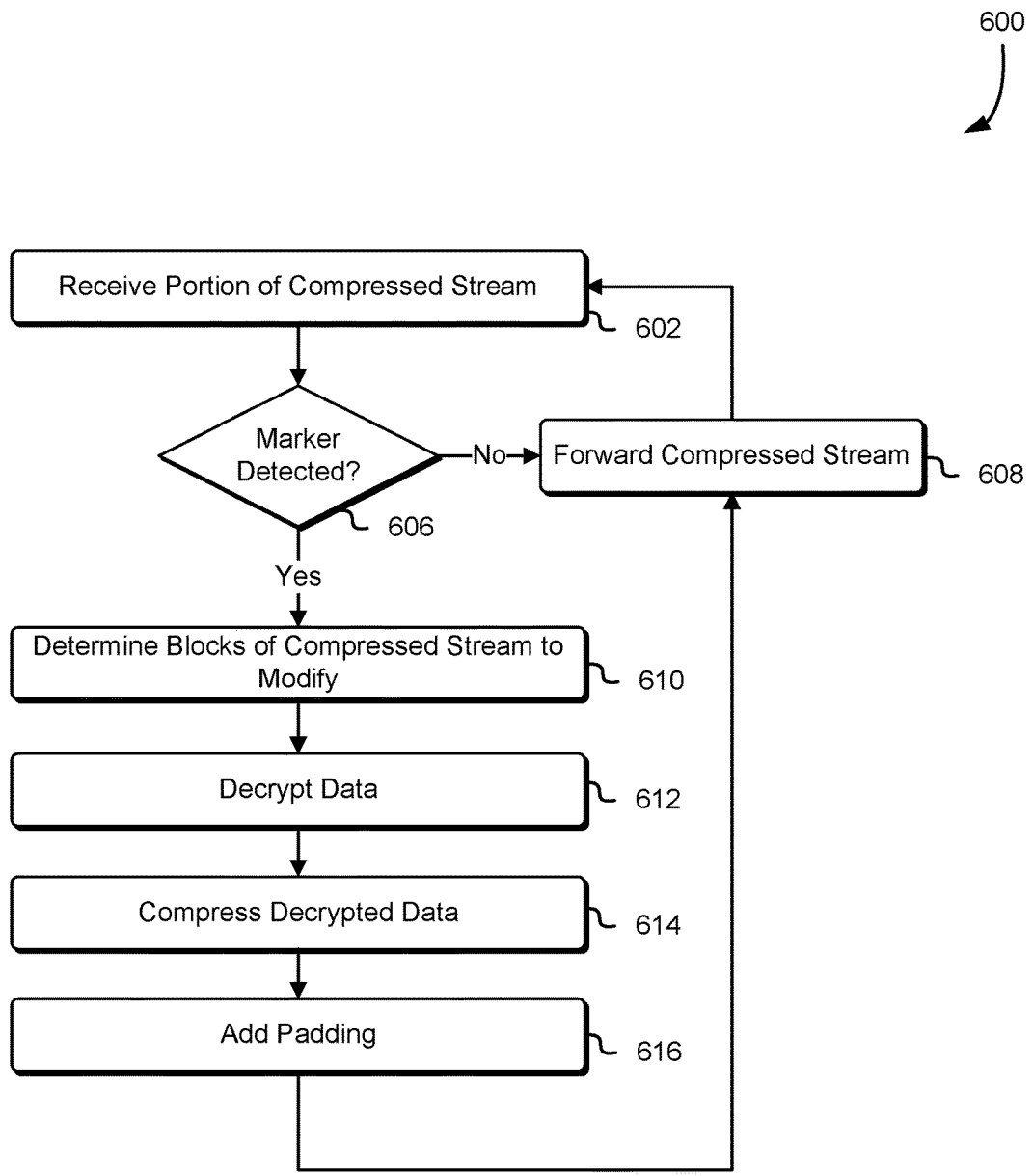
FIG. 6 is a block diagram that illustrates an example of a proxy fleet efficiently rewriting data included in a compressed data stream in accordance with an embodiment.

FIG. 6 is a block diagram illustrating an example of a process 600 for modifying a compressed data stream in accordance with an embodiment. The process 600 may be performed by any suitable system such as a proxy fleet described above in connection with FIGS. 1 and 2. Some or all of the process 600 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 600 includes receiving a portion of a compressed data stream 602. The compressed data stream may be generated by a backend service and directed to a customer as described above. The customer may include any entity, service, or computer system that consumes data included in the compressed data stream. In addition, the compressed data stream may be formatted or include information, such as a marker or flag, indicating if data within the compressed stream is to be modified prior to consumption. If no marker is detected 606, the proxy fleet may forward the compressed stream to the customer 608.

However, if a marker is detected 606, the proxy fleet may determine one or more blocks of the compressed stream to modify 610. As described above, the marker may be placed at both side of the data to be modified indicating the blocks or portion of the compressed data stream to modify. As illustrated by the process 600, modifying the compressed data stream may include decrypting data. Therefore, the proxy fleet may determine what blocks of the compressed data stream are encrypted. Furthermore, as described above, the compressed data stream may be decompressed so that it may be processed by the secure proxy fleet.

Returning to the process 600, the proxy fleet may then decrypt the data 612. Decrypting the data may be performed by the proxy fleet or may be performed at least in part by a cryptographic key management service as described above. Once the data has been decrypted, the proxy fleet may compress the decrypted data 614. The decrypted data may be compressed using the same compression algorithm as the compressed data stream. The secure proxy fleet may then add padding 616 to the compressed decrypted data. The padding, as described above, may prevent errors in decompression by moving the modified compressed data to a point in the data stream where there is no longer any back-references in the compressed data to the modified compressed data. The proxy fleet 608 may then forward the compressed stream 608 including the modified compressed data and any buffered portion of the compressed data stream. In addition, the proxy may return to step 602 and receive additional data of the compressed data stream. Note that one or more of the operations performed in 602-616 may be performed in various orders and combinations, including in parallel.

Figure 7:
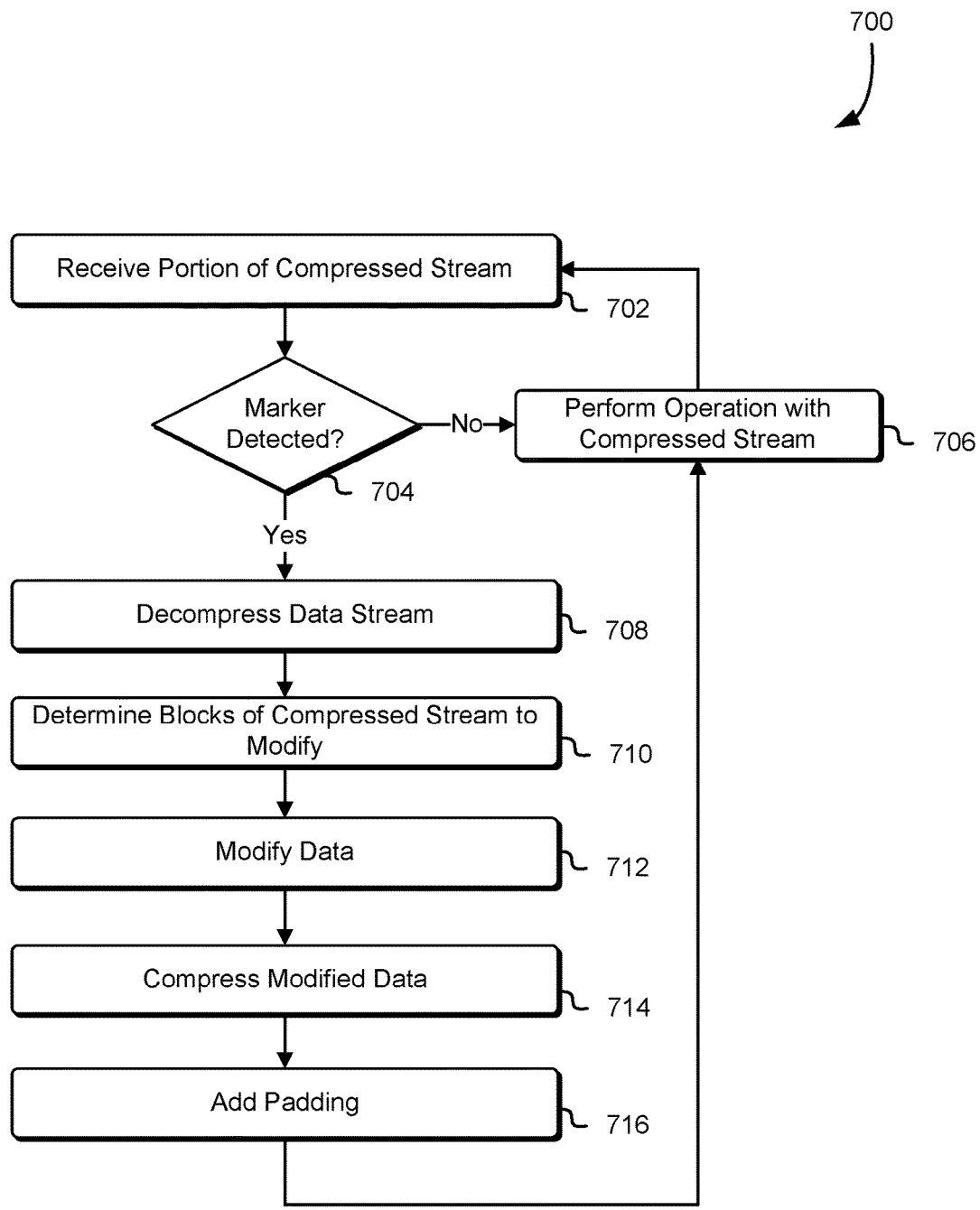
FIG. 7 is a block diagram that illustrates an example of a proxy fleet efficiently rewriting data included in a compressed data stream in accordance with an embodiment.

FIG. 7 is a block diagram illustrating an example of a process 700 for modifying a compressed data stream in accordance with an embodiment. The process 700 may be performed by any suitable system such as a proxy fleet described above in connection with FIGS. 1 and 2. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

The process 700 includes receiving a portion of a compressed data stream 702. The compressed data stream may be generated by a backend service and directed to a customer as described above. The customer may include any entity, service, or computer system that consumes data included in the compressed data stream. In addition, the compressed data stream may be formatted or include information, such as a marker or flag, indicating if data within the compressed stream is to be modified prior to consumption. The marker may be included in the compressed data such that the marker may be detected in the compressed data without having to decompress the compressed data stream. In other words, the marker is at the level of the compressed data and is created as a result of executing a particular compression algorithm.

If no marker is detected 704, the proxy fleet may perform the compressed stream to the customer 706. The operation may include a variety of operations that may be performed on data. For example, the operation may include writing the compressed data stream to a file, forwarding the compressed data stream to a destination, creating a structured data object, writing to a particular storage location, or other operation of data. However, if a marker is detected 704, the proxy fleet may decompress a portion of the compressed stream 708 so that the data may be modified as described above.

Once the data stream is decrypted, the proxy fleet may determine one or more blocks of the compressed stream to modify 710. As described above, the marker may be placed at both side of the data to be modified indicating the blocks or portion of the compressed data stream to modify. Modifying the compressed data stream may include decrypting data. Therefore, the proxy fleet may determine what blocks of the compressed data stream are encrypted. Furthermore, as described above, the compressed data stream may be decompressed so that is may be processed by the secure proxy fleet.

Returning to the process 700, the proxy fleet may then modify the data 712. Modifying the data may be performed by the proxy fleet or may be performed by another service. For example, modifying the data may include injecting content in the data which may be generated and/or obtained from a different service of the computing resource service provider. Once the data has been modified, the proxy fleet may compress the modified data 714. The modified data may be compressed using the same compression algorithm as the compressed data stream. The secure proxy fleet may then add padding 716 to the compressed modified data. The padding, as described above, may prevent errors in decompression by moving the modified compressed data to a point in the data stream where there is no longer any back-references in the compressed data to the modified compressed data. The proxy fleet may then perform an operation on the compressed stream 608 including the modified compressed data and any buffered portion of the compressed data stream. In addition, the proxy may return to step 702 and receive additional data of the compressed data stream. Note that one or more of the operations performed in 702-716 may be performed in various orders and combinations, including in parallel.

Figure 8:
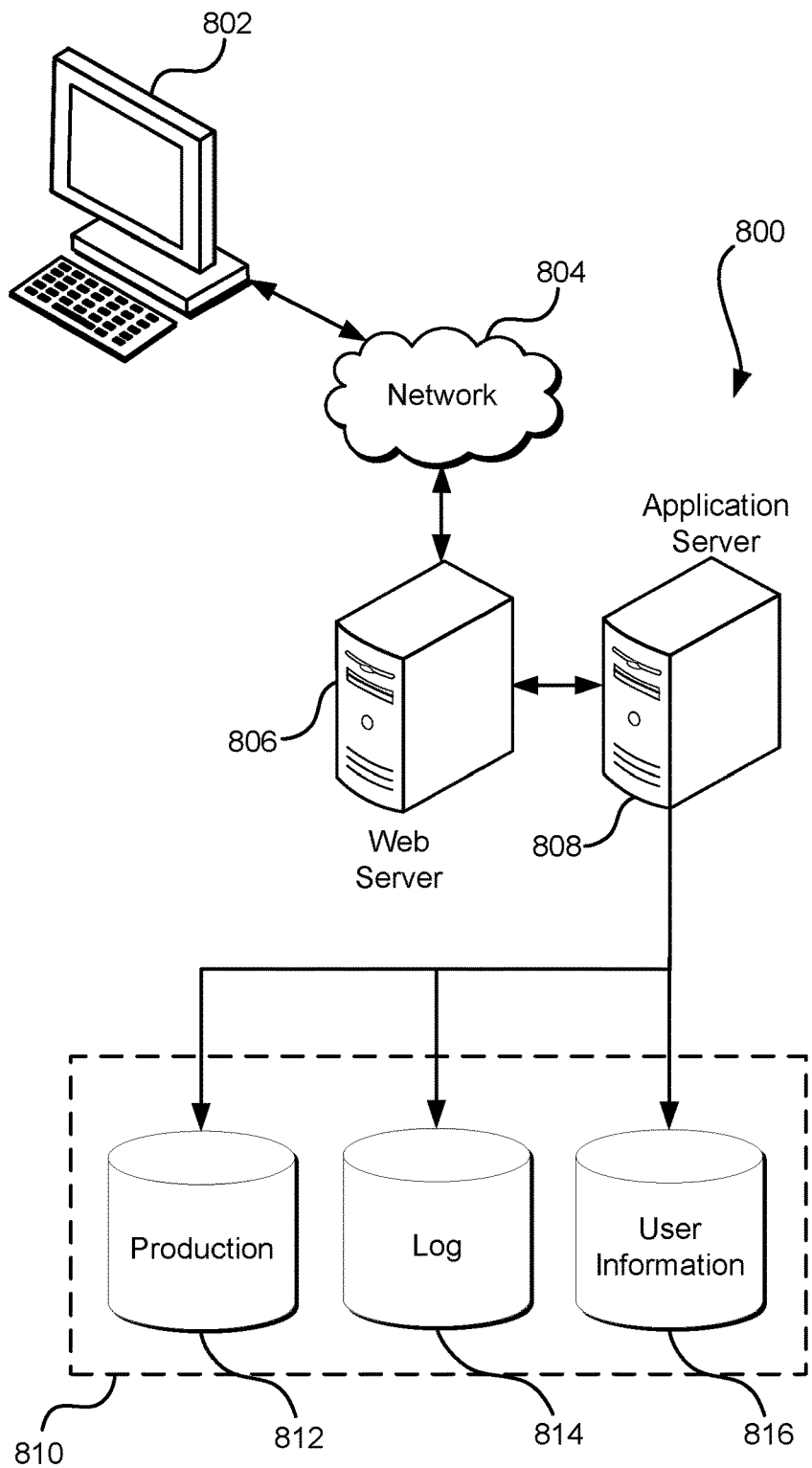
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a portion of a compressed data stream from a service endpoint directed towards a client device;
   decompressing the portion of the compressed data stream to obtain decompressed data;
   determining whether the decompressed data contains a marker indicating the decompressed data includes encrypted data;
   transmitting the decompressed data or a modified compressed data stream to the client device based at least in part on whether the decompressed data contains the marker;
   in response to the determination that the decompressed data contains the marker, perform at least:
      determining a set of data blocks of the decompressed data to decrypt based at least in part on the marker;
      decrypting the encrypted data to generate decrypted data;

determining a boundary block of the compressed data stream;
compressing the decrypted data to generate a set of compressed data blocks;
generating the modified compressed data stream by adding the set of compressed data blocks to the compressed data stream;
adding padded values to the modified compressed data stream until the boundary block is reached; and
transmitting the modified compressed data stream to the client device.

2. The computer-implemented method of claim 1, wherein the compressed data stream is associated with a response to a Hypertext Transfer Protocol (HTTP) request.

3. The computer-implemented method of claim 1, further comprises:
receiving additional data included in the compressed data stream;
decompressing the additional data;
determining the additional data lacks the marker; and
as a result of the additional data lacking the marker, forwarding the additional data to the client device without modifying the additional data.

4. The computer-implemented method of claim 1, wherein the boundary block of the compressed data stream further comprises a first block of the compressed data stream that contains no reference to unmodified data.

5. A system, comprising:
one or more processors; and
memory that stores computer-executable instructions that, as a result of being executed, cause the system to:
receive a set of blocks of compressed data from a portion of a compressed stream;
decompress at least a portion of the set of blocks of compressed data to generate a set of data objects;
determine whether to perform an operation to modify a data object of the set of data objects based at least in part on whether a marker in the set of data objects exists;
transmit the set of data objects or a modified compressed data to a client device based at least in part on whether the marker exists;
in response to the marker existing in the set of data objects, perform at least:
determine a boundary block of the compressed data;
modify the data object of the set of data objects as a result of performing the operation;
determine, based at least in part on the modified data object, a modified compressed data;
add padding to the modified compressed data based at least in part on the boundary block; and
transmit the modified compressed data.

6. The system of claim 5, wherein the memory further includes computer-executable instructions that, as a result of being executed, cause the system to decompress the entire compressed stream.

7. The system of claim 5, wherein the operation modifying the data object of the set of data objects further includes decrypting the data object.

8. The system of claim 5, wherein the operation modifying the data object of the set of data objects further includes modifying a value represented by the data object.

9. The system of claim 5, wherein compressing the modified data object further include compressing the modified data object using a compression algorithm that utilizes a shared dictionary.

10. The system of claim 5, wherein the memory further includes computer-executable instructions that, as a result of being executed, cause the system to modify a second data object of the set of data objects as a result of determining to perform the operation on the second data object.

11. The system of claim 5, wherein the padding further comprises values ignored by a compression algorithm used to compress the modified data object.

12. The system of claim 5, wherein the memory further includes computer-executable instructions that, as a result of being executed, cause the system to cause blocks of compressed data included in the compressed stream to be stored in a buffer as a result of the blocks not being associated with a flag where the flag is used to determine which data object of the set of data objects to perform the operation.

13. A non-transitory computer-readable storage medium having stored thereon executable instructions that, as a result of being executed by one or more processors of a computer system, cause the computer system to at least:
receive a set of compressed data objects;
decompress at least a portion of the set of compressed data objects to generate a set of decompressed data objects;
determine whether to modify the set of decompressed data objects based at least in part on whether a marker in the set of decompressed data objects exists;
transmit the set of decompressed data objects or modifications to the set of decompressed data objects to a client device based at least in part on whether the marker exists;
in response to the marker existing in the set of decompressed data objects, perform at least:
determine a subset of decompressed data objects of the set of decompressed data objects;
modify the subset of decompressed data objects;
add padding to the set of decompressed data objects until a boundary block is reached to result in a portion of a stream;
compress the portion of the stream; and
transmit the portion of the stream.

14. The non-transitory computer-readable storage medium of claim 13, wherein the instructions further comprise instructions that, as a result of being executed by the one or more processors, cause the computer system to buffer a portion of the set of compressed data objects until transmission of the set of data compressed objects.

15. The non-transitory computer-readable storage medium of claim 13, wherein the instructions further comprise instructions that, as a result of being executed by the one or more processors, cause the computer system to, prior to transmission of the portion of the stream, forward at least a portion of the set of compressed data objects in the stream.

16. The non-transitory computer-readable storage medium of claim 15, wherein the instructions that cause the computer system to forward at least the portion of the set of compressed data objects further include instructions that cause the computer system to include sequencing information in the portion of the set of compressed data objects when transmitted in the stream.

17. The non-transitory computer-readable storage medium of claim 15, wherein the instructions that cause the computer system to forward at least the portion of the set of compressed data objects further include instructions that cause the computer system to:
determine length information associated with the set of decompressed data objects; and
transmit the length information along with the portion of the stream.

18. The non-transitory computer-readable storage medium of claim 13, wherein the instructions that cause the computer system to modify the subset of decompressed data objects further include instructions that cause the computer system to decrypt at least one decompressed data object of the subset of decompressed data objects.

19. The non-transitory computer-readable storage medium of claim 18, wherein the instructions that cause the computer system to decrypt the at least one decompressed data object of the subset of decompressed data objects further include instructions that cause the computer system to transmit a request to a cryptographic key management service to decrypt the at least one decompressed data object.

20. The non-transitory computer-readable storage medium of claim 13, wherein the instructions that cause the computer system to modify the subset of decompressed data objects further include instructions that cause the computer system to insert content into the subset of decompressed data objects, the content configured for display in a user interface rendered by a client device.

* * * * *